(12) United States Patent
Müller-Haas

(10) Patent No.: US 8,539,758 B2
(45) Date of Patent: Sep. 24, 2013

(54) EXHAUST-GAS PURIFICATION SYSTEM FOR DIESEL ENGINES

(75) Inventor: Klaus Müller-Haas, Köln (DE)

(73) Assignee: EMITEC Gesellschaft fuer Emissionstechnologie mbH, Lohmar (DE)

(*) Notice: Subject to any disclaimer, the term of this patent is extended or adjusted under 35 U.S.C. 154(b) by 185 days.

(21) Appl. No.: 13/070,822

(22) Filed: Mar. 24, 2011

(65) Prior Publication Data

US 2011/0219755 A1  Sep. 15, 2011

Related U.S. Application Data

(63) Continuation of application No. PCT/EP2009/061922, filed on Sep. 15, 2009.

(30) Foreign Application Priority Data

Sep. 24, 2008  (DE) .................. 10 2008 048 796

(51) Int. Cl.
  *F01N 3/035*  (2006.01)
(52) U.S. Cl.
  USPC .............................................. 60/295; 60/297
(58) Field of Classification Search
  USPC ..................................... 60/295, 297, 301, 303
  See application file for complete search history.

(56) References Cited

U.S. PATENT DOCUMENTS

| | | | |
|---|---|---|---|
| 6,235,254 B1 * | 5/2001 | Murphy et al. | 423/212 |
| 6,444,177 B1 | 9/2002 | Mueller et al. | |
| 6,680,037 B1 * | 1/2004 | Allansson et al. | 423/215.5 |
| 2003/0108457 A1 | 6/2003 | Gault et al. | |
| 2006/0153748 A1 | 7/2006 | Huthwohl et al. | |
| 2008/0066451 A1 | 3/2008 | Warner et al. | |

FOREIGN PATENT DOCUMENTS

| | | | |
|---|---|---|---|
| DE | 202007008906 U1 * | 9/2007 | |
| GB | 2381218 A | 4/2003 | |
| WO | 9701387 A1 | 1/1997 | |
| WO | 0142630 A2 | 6/2001 | |
| WO | 2004038192 A1 | 5/2004 | |
| WO | WO 2006057305 A1 * | 6/2006 | |

OTHER PUBLICATIONS

International Search Report dated Dec. 3, 2009.

* cited by examiner

*Primary Examiner* — Thomas Denion
*Assistant Examiner* — Jonathan Matthias
(74) *Attorney, Agent, or Firm* — Laurence A. Greenberg; Werner H. Stemer; Ralph E. Locher

(57) ABSTRACT

An exhaust gas purification system for diesel engines includes at least one oxidation catalytic converter, a reducing agent injection device and a reduction catalytic converter disposed together in a housing having a first lateral chamber close to a first end side and a second lateral chamber close to a second end side. The reduction catalytic converter is disposed in the first lateral chamber, the oxidation catalytic converter is disposed in an outer annular space of the second lateral chamber and the reducing agent injection device is oriented toward an inner channel of the outer annular space of the second lateral chamber. A flow path for the exhaust gas from at least one exhaust gas inlet toward at least one exhaust gas outlet is provided through the oxidation catalytic converter, the reducing agent injection device and the reduction catalytic converter.

12 Claims, 1 Drawing Sheet

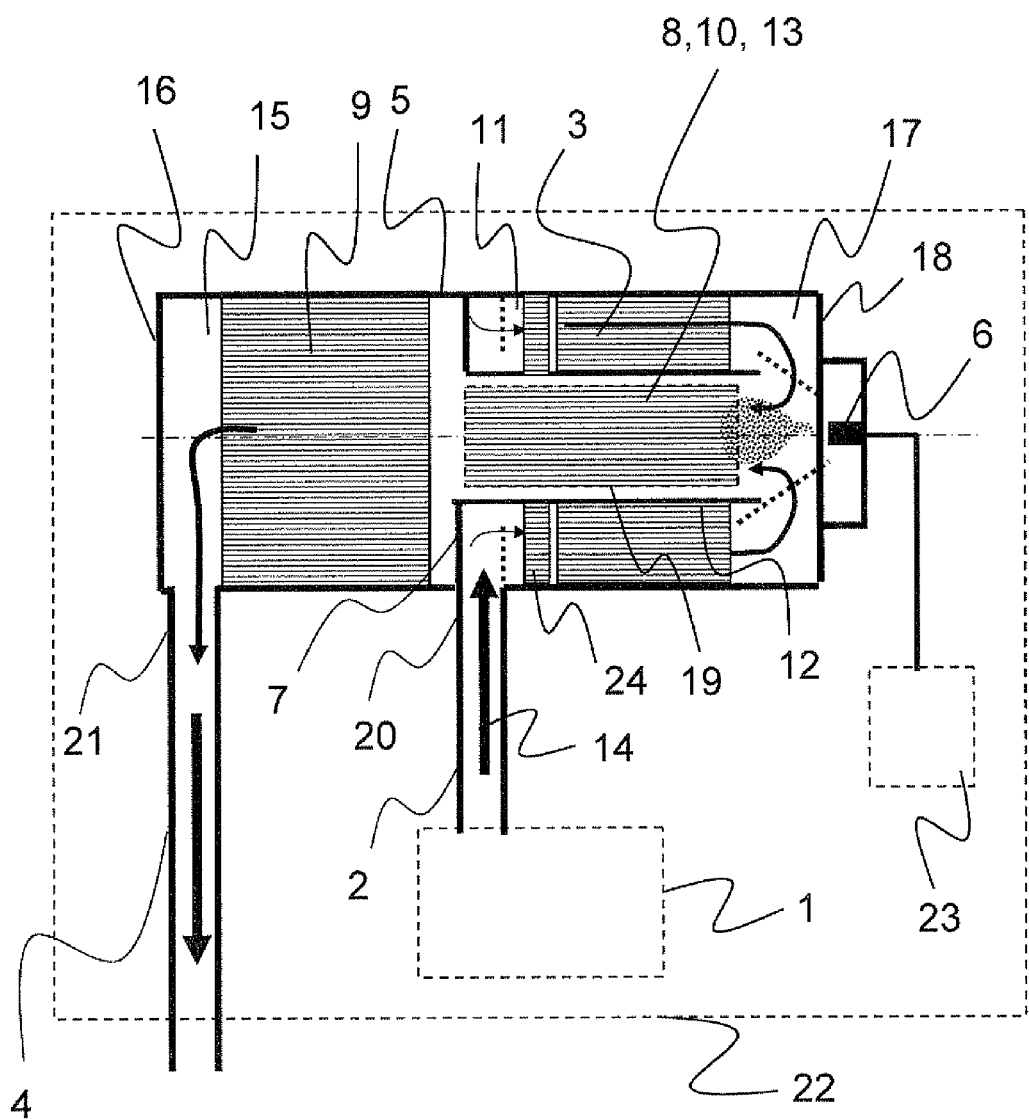

EXHAUST-GAS PURIFICATION SYSTEM FOR DIESEL ENGINES

CROSS-REFERENCE TO RELATED APPLICATION

This is a continuation, under 35 U.S.C. §120, of copending International Application No. PCT/EP2009/061922, filed Sep. 15, 2009, which designated the United States; this application also claims the priority, under 35 U.S.C. §119, of German Patent Application DE 10 2008 048 796.1, filed Sep. 24, 2008; the prior applications are herewith incorporated by reference in their entirety.

BACKGROUND OF THE INVENTION

Field of the Invention

The invention relates to an exhaust-gas purification system for diesel engines, in particular of utility motor vehicles, including exhaust-gas purification components, such as, for example, an oxidation catalytic converter, a reducing agent injection device, a soot particle separator and a reduction catalytic converter, disposed in an exhaust section.

In the field of the exhaust-gas treatment of mobile internal combustion engines, it has proven to be particularly expedient to use catalytic converters and soot particle separators constructed as honeycomb bodies, which have carrier elements (in particular metallic sheet-metal foils, wire nonwovens, etc., or else ceramic plates, extrudates, etc.) that form channels. It is possible for the structures of the carrier elements to be provided with microstructures which form openings and flow-guiding surfaces which are aligned so as to conduct partial flows of the exhaust gases along the carrier elements from the inside to the outside and/or vice versa.

Different processes are used for the conversion of the harmful constituents of the exhaust gas of diesel engines. For example, in the so-called "CRT" process, which is used for the reduction of soot, a conversion of soot is motivated even at low temperatures through the use of nitrogen dioxide generated in the exhaust gas. It is likewise possible for the so-called SCR process to be used, in which the nitrogen oxides contained in the exhaust gas are reduced through the use of a reducing agent (urea, ammonia, etc.). Combinations of those methods have also already been proposed. For that purpose, it is necessary for catalytic converters to be disposed in the exhaust system, wherein specifically in utility motor vehicles, due to the amount of exhaust gas produced, space problems can arise when integrating relatively large-volume converters.

It emerges therefrom that the described exhaust-gas purification systems still have room for improvement in order to improve the thermal response behavior (for example after a cold start) and to obtain the highest possible exhaust-gas purification rate over a long period of time. Furthermore, it is sought to adapt the exhaust-gas purification system for diesel engines of utility motor vehicles to the given spatial conditions, taking into consideration the need to provide a large-volume exhaust muffler in order to meet the relevant legal regulations.

SUMMARY OF THE INVENTION

It is accordingly an object of the invention to provide an exhaust-gas purification system for diesel engines, which overcomes the hereinafore-mentioned disadvantages and at least partially solves the highlighted problems of the heretofore-known systems of this general type and which specifies structural details of such a system for diesel engines, in particular for utility motor vehicles, with which it is possible to provide an efficient exhaust-gas purification configuration which has a simple and inexpensive construction and permits a space-saving configuration.

With the foregoing and other objects in view there is provided, in accordance with the invention, an exhaust-gas purification system for diesel engines. The exhaust-gas purification system comprises a housing having a first end side, a second end side, a first lateral chamber in vicinity of the first end side and a second lateral chamber in vicinity of the second end side, the second lateral chamber having an outer annular space with an inner channel. At least one exhaust-gas inlet leads into the housing and at least one exhaust-gas outlet leads out of the housing. A reduction catalytic converter is disposed in the first lateral chamber of the housing. At least one oxidation catalytic converter is disposed in the outer annular space of the second lateral chamber of the housing. A reducing agent injection device is disposed in the housing and directed toward the inner channel of the outer annular space of the second lateral chamber. A flow path for the exhaust gas from the at least one exhaust-gas inlet to the at least one exhaust-gas outlet passes through the at least one oxidation catalytic converter, the reducing agent injection device and the reduction catalytic converter.

The reduction catalytic converter is preferably an SCR catalytic converter, in particular with a ceramic honeycomb structure. The reduction catalytic converter serves ultimately to reduce the nitrogen oxides through the use of the reducing agent, so as to form nitrogen and water vapor.

The oxidation catalytic converter is preferably a circular-ring-shaped metallic honeycomb body coated with high-grade metal (for example platinum). The oxidation catalytic converter serves to oxidize unburned hydrocarbons and carbon monoxide contained in the exhaust gas so as to form water and carbon dioxide, and to oxidize nitrogen oxides contained in the exhaust gas to form $NO_2$.

The reducing agent injection device serves in particular to inject a fluid, preferably a liquid. Consideration is given to ammonia and/or an ammonia precursor (urea, AdBlue) as reducing agents. The reducing agent is injected through the use of a reducing agent dosing device, through the reducing agent injection device into the exhaust gases, wherein primarily urea is injected as a reducing agent. The urea is decomposed to form ammonia, if appropriate in a reducing agent decomposition device.

Therefore, an exhaust-gas purification system for diesel engines, in particular of utility motor vehicles and non-road motor vehicles, is also proposed, having exhaust-gas purification components, such as an oxidation catalytic converter, a reducing agent injection device and a reduction catalytic converter, disposed in an exhaust section. The exhaust-gas purification components are disposed in a housing with an exhaust-gas inlet disposed on the periphery approximately centrally in the region of a partition. The exhaust gas from the exhaust-gas inlet follows an annular chamber which proceeds from the partition, extends in the direction of a housing terminating wall (second end side), ends at a distance before the housing terminating wall, and in which an oxidation catalytic converter is disposed through which a flow can pass. There, close to the second end side, a flow deflection takes place, wherein adequate turbulence of the exhaust gas is generated, into which the reducing agent can now be introduced. The reducing agent injection device is disposed coaxially with respect to the annular chamber and the channel and extends through the housing terminating wall of the second end side, in such a way that the reducing agent can be injected into the coaxial pipe and, there, is mixed with the exhaust gases flowing through the channel in the same direction. The exhaust gas-reducing agent mixture then passes into the first chamber with the reduction catalytic converter downstream of the partition in the housing, with the exhaust gas being selectively reduced as it flows through the reduction catalytic converter.

The exhaust-gas purification system according to the invention has an extremely compact construction and can therefore advantageously be disposed in the vicinity of the engine, in such a way that the exhaust gases enter into the exhaust-gas purification system having only cooled down to a small extent. This, together with the fact that the oxidation catalytic converter disposed in the annular chamber prevents a further cooling of the exhaust gas in such a way that they enter into the coaxial channel at a high temperature, increases the effect of the reducing agent injected in the channel being quickly evaporated and mixing with the exhaust gases, which is promoted by the warm channel, formed by the pipe, in the core of the system.

In accordance with another feature of the exhaust-gas purification system of the invention, the channel is formed with at least one mixing element.

In accordance with a further feature of the exhaust-gas purification system of the invention, the channel is formed with at least one soot particle separator. The soot particles generated in the diesel engine process are filtered out in the soot particle separator and oxidized to form carbon dioxide.

In accordance with an added feature of the invention, the channel is formed with at least one hydrolysis catalytic converter. A conversion of an ammonia precursor to ammonia can be assisted in this way.

In accordance with an additional feature of the invention, in order to obtain the most thorough possible mixing of the reducing agent with the exhaust gases, a mixing element is preferably disposed in the pipe. The mixing element may be constructed as a soot particle separator which fills out the pipe. The soot particle separator may (also) have a catalyst coating for the reduction and/or hydrolysis of the reducing agent. In this respect, the channel may be formed with different zones in the flow direction of the exhaust gas (along the predefined flow path), although a superposition of a multiplicity of the above-mentioned zones (single-piece construction) is also possible.

The oxidation catalytic converter and/or the soot particle separator and/or the reducing agent catalytic converter are preferably provided with structured carrier elements which form channels, and the structures of the carrier elements have microstructures which form openings and flow-guiding surfaces which are aligned so as to conduct partial flows of the exhaust gases along the carrier elements from the inside to the outside and/or vice versa. In this way, a homogenization of the flow speed over the cross section of the above-mentioned components, a thorough mixture of the partial flows, and a separation of laminar flows is obtained, as a result of which the effectiveness of the elements of the exhaust-gas purification system is considerably increased.

In accordance with yet another feature of the invention, the at least one exhaust-gas outlet is disposed between the reducing agent catalytic converter and the first end side. The housing of the exhaust-gas purification system accordingly has a further terminating wall downstream of the reducing agent catalytic converter, and a gas outlet may be disposed either in the terminating wall or adjacent the terminating wall over the circumference of the housing. This provides a large amount of freedom for the structural layout of the exhaust-gas purification system, which can thereby be adapted in an ideal manner to the given spatial conditions.

In accordance with yet a further feature of the invention, it is also considered to be advantageous for the reducing agent injection device to be directed toward the oxidation catalytic converter. In other words, this means that an eccentric configuration in relation to the inner channel is provided, in such a way that a part of the metered reducing agent can also pass (counter to the flow path of the exhaust gas) to the rear wall of the oxidation catalytic converter (wherein no high-grade metal coating is provided in this case). As a result of the exothermic reactions in the oxidation catalytic converter, the rear wall is generally very hot during operation, in such a way that when the liquid reducing agent comes into contact with the surface, fast evaporation and/or thermolysis takes place. Furthermore, a hydrolysis coating may be provided at least partially in that region of the rear wall of the oxidation catalytic converter which is impinged upon by the metered reducing agent. The region may in particular be formed as a ring segment of the annular oxidation catalytic converter. The ring segment is preferably the only region of the oxidation catalytic converter impinged upon by the reducing agent.

In accordance with yet an added feature of the exhaust-gas purification system of the invention, the first lateral chamber and the second lateral chamber are spaced apart by a partition which has a pipe serving to form the channel. The pipe also serves, for example, as a support for the annular oxidation catalytic converter. The pipe and the partition are preferably welded to one another or provided in one piece.

In accordance with a concomitant feature of the exhaust-gas purification system of the invention, an electric heater is provided at least upstream of the oxidation catalytic converter or the hydrolysis catalytic converter. In other words, this means that the exhaust gas flows firstly through the at least one heater before being conducted to the oxidation catalytic converter and/or the hydrolysis catalytic converter. An electrically heatable honeycomb structure is preferably used as the heater.

Other features which are considered as characteristic for the invention are set forth in the appended claims, noting that the features specified individually in the dependent claims may be combined with one another in any desired technologically meaningful way and define further embodiments of the invention.

Although the invention is illustrated and described herein as embodied in an exhaust-gas purification system for diesel engines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The FIGURE of the drawing is a diagrammatic, sectional view of a motor vehicle having an exhaust-gas purification system according to the invention.

DETAILED DESCRIPTION OF THE INVENTION

Referring now in detail to the single FIGURE of the drawing for explaining the invention and the technical field in more detail by showing a particularly preferred structural variant to which the invention is not restricted, there is seen an exhaust-gas purification system which is constructed, in particular, for diesel engines of utility motor vehicles. The power demand on utility motor vehicles is high, while fuel consumption should be as low as possible. During the combustion of the fuel in the individual cylinders of a diesel engine, primarily carbon dioxide and water vapor are generated, but the combustion is incomplete, so that unburned hydrocarbon compounds, carbon monoxide, soot and, due to the high combustion temperatures, nitrogen oxides, are present in the exhaust gases, and they must be removed from the exhaust gases to the greatest possible extent through the use of the exhaust-gas purification system according to the invention.

According to the FIGURE, a diesel engine 1 in a motor vehicle 22 is connected through an exhaust pipe 2 to a housing 5 of the exhaust-gas purification system. The exhaust pipe 2 has an exhaust-gas inlet 20 which opens out, through the periphery of the housing 5, approximately centrally into a region of a partition 7. The partition 7 supports a pipe 12 which is coaxial with respect to the housing 5 and forms an annular chamber 11 between the pipe 12 and the housing 5. The partition 7 divides the housing 5 into a first lateral chamber 15 close to a first end side 16 and a second lateral chamber 17 close to a second end side 18, of the housing 5. The pipe 12 ends at a distance upstream of the second end side 18, formed by a terminating wall, where the exhaust gases, denoted by arrows indicating a flow path 14, are deflected and flow through the inside of the pipe 12, through a channel 19, in the opposite direction.

Disposed in the annular chamber 11 are a circular-ring-shaped heater 24 and, directly downstream thereof, an oxidation catalytic converter 3, where the unburned gaseous constituents of the exhaust gas are oxidized to form water vapor and carbon dioxide. Furthermore, the highest possible fraction of the nitrogen oxides in the exhaust gases is oxidized to form nitrogen dioxide ($NO_2$).

A reducing agent injection device 6, which is disposed in the second end side 18, coaxially with respect to the pipe 12, injects the reducing agent into the exhaust gases flowing through the pipe 12 (and if appropriate also onto the rear wall of the oxidation catalytic converter 3). For this purpose, a supply system 23, for example a tank, a valve, a pump, etc., is provided for supplying a liquid urea-water solution.

As is shown in the FIGURE, a mixing element 10, which may be disposed in the pipe 12, serves to generate intensive mixing of the reducing agent with the exhaust gases. The mixing element is preferably constructed as a soot particle separator 8 which fills out the pipe 12 and which, if appropriate, is even also provided at least partially with a catalyst coating for the reduction and/or hydrolysis of the reducing agent (forming a hydrolysis catalytic converter 13, if appropriate with an upstream heater). The reducing agent is composed of urea, which is split or broken up by the catalyst coating of the soot particle separator, into water vapor and ammonia ($NH_3$).

The greatest possible fraction of the soot particles contained in the exhaust gases is trapped and burned in the soot particle separator 8. The exhaust gases pass from the soot particle separator 8 directly into the first chamber 15, which has a reduction catalytic converter 9 in which the nitrogen oxides are catalytically reduced to form nitrogen and water vapor, with the addition of the reducing agent. If appropriate, a non-illustrated trapping device for excess ammonia may also be connected downstream of the reduction catalytic converter 9. The exhaust gases emerging from the reduction catalytic converter 9 leave the housing 5 through an exhaust-gas outlet 21 and flow into an exhaust pipe 4 which, in the illustrated exemplary embodiment, is disposed on the periphery of the housing 5 adjacent a terminating wall of the first end side 16. The exhaust-gas outlet 21 may also be disposed differently, for example coaxially with respect to the housing 5, depending on spatial conditions.

The present invention is not restricted to the illustrated exemplary embodiments. In fact, numerous modifications of the invention are possible within the scope of the claims.

The invention claimed is:

1. An exhaust-gas purification system for diesel engines, the exhaust-gas purification system comprising:
   a housing having a first end side, a second end side, a first lateral chamber in vicinity of said first end side and a second lateral chamber in vicinity of said second end side, said second lateral chamber having an outer annular space with an inner channel;
   at least one exhaust-gas inlet leading into said housing and at least one exhaust-gas outlet leading out of said housing;
   a reduction catalytic converter disposed in said first lateral chamber of said housing;
   at least one oxidation catalytic converter disposed in said outer annular space of said second lateral chamber of said housing;
   a reducing agent injection device disposed in said housing and directed toward said inner channel of said outer annular space of said second lateral chamber;
   at least one soot particle separator disposed in said inner channel; and
   a flow path for the exhaust gas from said at least one exhaust-gas inlet to said at least one exhaust-gas outlet passing successively through said at least one oxidation catalytic converter, said reducing agent injection device, said at least one soot particle separator, and said reduction catalytic converter.

2. The exhaust-gas purification system according to claim 1, which further comprises at least one mixing element disposed in said channel.

3. The exhaust-gas purification system according to claim 1, which further comprises at least one hydrolysis catalytic converter disposed in said channel.

4. The exhaust-gas purification system according to claim 1, wherein said at least one exhaust-gas outlet is disposed between said reduction catalytic converter and said first end side of said housing.

5. The exhaust-gas purification system according to claim 1, wherein said reducing agent injection device is directed toward said at least one oxidation catalytic converter.

6. The exhaust-gas purification system according to claim 5, wherein said oxidation catalytic converter has a rear wall, a hydrolysis coating at least partially provided in a region of said rear wall, said reducing agent injecting device for directing the metered reducing agent onto said hydrolysis coating.

7. The exhaust-gas purification system according to claim 1, which further comprises a partition spacing said first lateral chamber and said second lateral chamber apart from each other, said partition having a pipe forming said channel.

8. The exhaust-gas purification system according to claim 7, wherein said pipe defines said annular outer space and serves as a support for said oxidation catalytic converter.

9. The exhaust-gas purification system according to claim 1, which further comprises an electric heater disposed at least upstream of said at least one oxidation catalytic converter.

10. The exhaust-gas purification system according to claim 1, which further comprises an electric heater disposed at least upstream of said hydrolysis catalytic converter.

11. The exhaust-gas purification system according to claim 1, wherein said oxidation catalytic converter has an uncoated rear wall and said reducing agent injecting device is directed toward said uncoated rear wall of oxidation catalytic converter.

12. The exhaust-gas purification system according to claim 1, wherein said soot particle separator and/or said reducing agent catalytic converter are provided with structured carrier elements which define channels, and structures of said structured carrier elements have microstructures which define openings and flow-guiding surfaces which are aligned to conduct partial flows of the exhaust gases along said carrier elements from inside to outside and/or vice versa.

* * * * *